United States Patent [19]

Waterman

[11] 4,450,315
[45] May 22, 1984

[54] THERMOCOUPLE ASSEMBLY

[76] Inventor: Roger S. Waterman, 20801 Higgins Ct., Palos Verdes, Calif. 90501

[21] Appl. No.: 426,818

[22] Filed: Sep. 29, 1982

[51] Int. Cl.³ .............................................. H01L 35/02
[52] U.S. Cl. ...................................... 136/230; 29/573; 374/179; 374/208
[58] Field of Search ................ 136/221, 230; 374/179, 374/208, 209; 29/573

[56] References Cited

U.S. PATENT DOCUMENTS 3,681,990  8/1972  Barrett et al. .................. 136/221 X
3,811,958  5/1974  Maurer .......................... 136/230 X
4,265,117  5/1981  Thoma et al. ...................... 136/221

Primary Examiner—Leland A. Sebastian
Attorney, Agent, or Firm—Howard L. Johnson

[57] ABSTRACT

A thermocouple assembly wherein the transition fitting has a separable nose piece which may be brazed to the probe casing before the transition fitting is coupled thereto, thus avoiding the previous occuring spread of brazing heat through the body of the fitting such as might damage contained wires and their soldered connections.

6 Claims, 6 Drawing Figures

THERMOCOUPLE ASSEMBLY

BACKGROUND OF THE INVENTION

For many years snub nose transition fittings were attached to a thermocouple probe casing or sheath by the process of brazing. However the brazing heat necessarily spread through the fitting and frequently damaged the contained thermocouple wires and/or their soldered connections. Accordingly, this process was superceded by use of a transition fitting having a short crimping nose which by use of a specialized tool was crimped or swaged onto the probe casing (U.S. Pat. No. 3,811,958 to Maurer). But this has not proven entirely satisfactory and brazing would still be preferred if the concurrent heat spread through the fitting could be avoided.

STATEMENT OF THE INVENTION

It has now been found possible to provide such a two-piece transition fitting which has a severable nose piece which can be brazed to the probe casing by itself (with the thermocouple wirings extending therethru) and the body of the fitting then coupled thereto, as by screw threads, after the heat has dissipated. Alternately, the body may be press fit onto the nose piece in the absence of screw threads. The body of encapsulation material forms a permanent union with the individual wires and the two pieces of the transition fitting.

DETAILED DESCRIPTION

Figure 1:
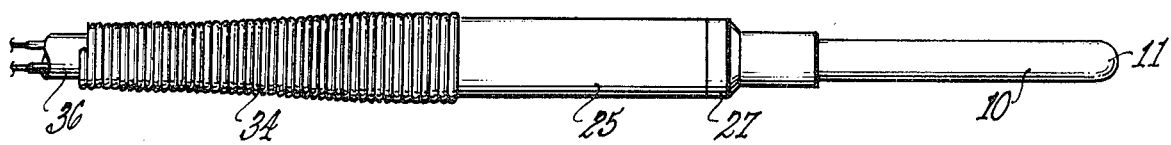
FIG. 1 is a longitudinal elevational view of the thermocouple assembly.
Figure 2:
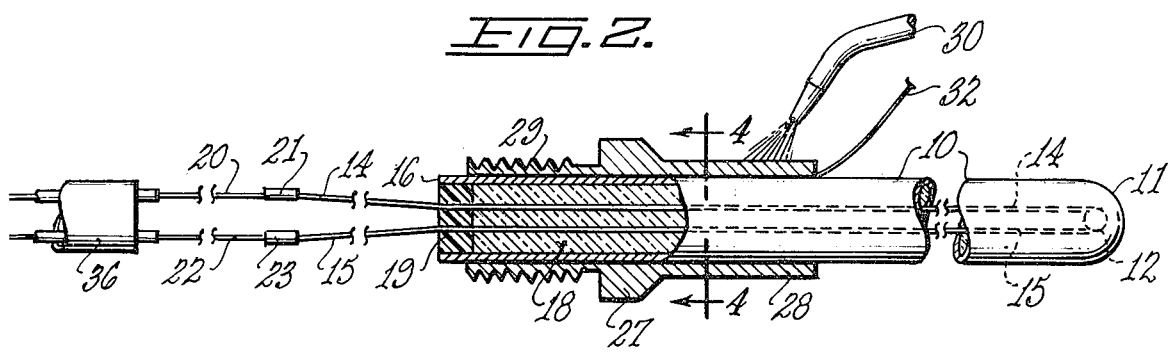
FIG. 2 is an axial sectional view of the separable nose piece being brazed to the inserted probe casing, the latter appearing partly in elevation.
Figure 3:
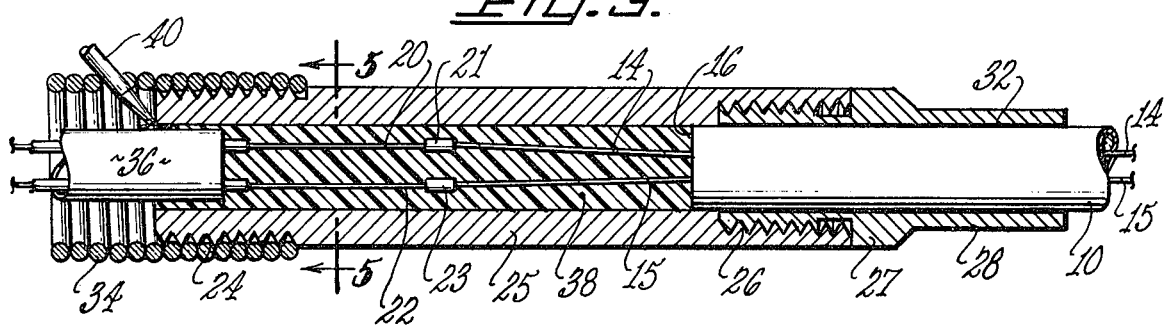
FIG. 3 is an axial sectional view of the transition fitting shown threadedly attached to the brazed nose piece and probe, and being filled with encapsulation material.
Figure 4:
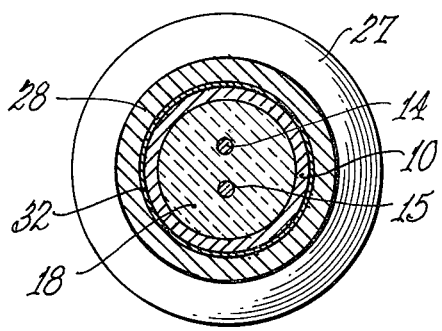
FIG. 4 is a transverse sectional view taken along line 4—4 of FIG. 2 showing the soldered joint.
Figure 5:
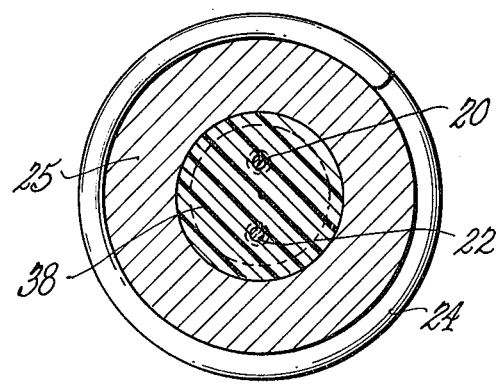
FIG. 5 is a transverse sectional view taken along the line 5—5 of FIG. 3.

The present assembly is formed by a heat-transmitting (metallic) casing or probe 10 having a distal closed end 11 which houses a thermocouple junction 12 from which a pair of thermocouple wires 14, 15 extend lengthwise, spaced apart, emerging through an open end 16 and extending therebeyond. The casing is typically filled with mineral insulation 18 which provides support for the thermocouple wires, with sealing material 19 forming a plug for the initially open end. Beyond the casing end 16, the thermocouple wires are soldered to extension wires 20, 22 which continue to remote utilization or monitoring device (not shown), the soldered unions 21, 23 and wires continuing to be held apart by insulating material.

The wire lengths for which the unions 21, 23 form a more or less midpoint is housed in a tubular, open-ended transition fitting 25 of which the distal end is internally threaded 26 for threaded engagement with a short tubular nose piece 27. The latter has an internal diameter which will slidingly receive the proximate end of the probe casing 10 inserted lengthwise therethrough, such end 16 then conveniently projecting a short distance beyond—that is, into the transition fitting when assembled. The nose piece 27 is formed with a terminal neck 28 of reduced diameter. This reduced neck 28, before coupling of the transition fitting 25 thereto, is brazed (by torch 30 and brazing solder 32) to the probe casing 10 and, if desired, the joint is subsequently anodized.

Following brazing of the nose piece 27 to the probe casing 10, the transition fitting 25 (with the wires 20, 22 extending therethrough) is coupled to the threads 29 of the nose piece. The enclosure of the fitting 25 can be filled then by encapsulation material 38 as through an injection nozzle 40. The proximate end of the transition fitting 25 may also be formed with a series of adjacent external grooves 24 for retention of the lead end of a flexible wire coil 34 through the center of which the wires 20, 22 extend within a support collar 36. Such coil serves to guard the emerging wires against injury by being abruptly bent or broken in handling the apparatus.

Figure 6:
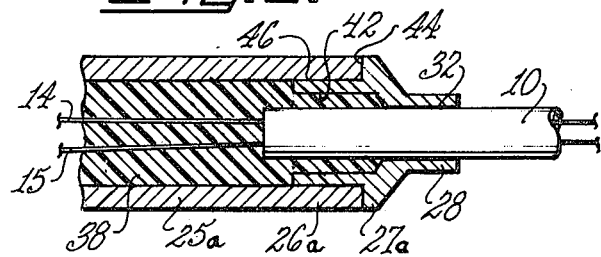
FIG. 6 is an axial sectional view of a modified body and nose piece of the transition fitting coupled by press fit.

The two pieces of the modified transition fitting of FIG. 6 lack screw threads and are formed with a relief bore 42 in the nose piece 27a. Upon assembly, an annular abutment face 44 registers with a press fit shoulder 46 of the nose piece and the encapsulation material 38 further aids in holding the two pieces together, as permanent union. Suitable encapsulation material is Emerson-Cummings epoxy resin for low temperature thermocouples (up to 250° F.) and sauereisen cement for temperatures up to 1000° F.

The body of the transition fitting 25 may be color coded in accordance with American National Standards Institute (ANSI) to signify the pair of dissimilar metals which are used as thermocouple conductors 12: yellow for Chromel/Alumel; black for Iron/Constantan; blue for Copper/Constantan; violet for Chromel/-Constantan; green for Platinum/Rhodium.

I claim:

1. A process for forming a thermocouple apparatus, comprising the steps of
   (a) providing a tubular, electrically conductive, casing constituting a probe and characterized by a distant closed end and a proximate open end, the interior of said casing enclosing a pair of thermocouple wires joined together to form a thermocouple junction located adjacent said closed end, the wires thence extending lengthwise, insulatingly spaced apart laterally, and having their respective ends projecting beyond said open end,
   (b) providing a two-piece tubular transition fitting consisting of a body piece and a nose piece separable from said body piece, said pieces having cooperable coupling means, and the proximate end of said casing being lengthwise insertable for a short distance into said nose piece,
   (c) inserting the proximate end of said casing including said projecting thermocouple wires extending therethrough into said nosepiece and forming a fixed union by brazing the casing to the nose piece,
   (d) forming soldered unions between said projecting ends of the thermocouple wires and respective extension wires, adapted to transmit current developed at the thermocouple junction to a remote utilization device, and
   (e) joining said transition fitting to said nose piece by said cooperable coupling means and inserting into the tubular fitting encapsulation material positioned to hold said soldered unions insulatingly spaced apart and sealed within the fitting.

2. A process according to claim 1 wherein said cooperable coupling means comprise screw thread means.

3. A process according to claim 1 wherein said cooperable coupling means comprise a press fit union of said body piece and said nose piece.

4. A thermocouple apparatus comprising in combination:
   a tubular electrically conductive casing constituting a probe and enclosing a pair of thermocouple wires joined together to form a thermocouple junction located adjacent a closed end of the probe, said wires extending lengthwise, insulatingly spaced apart and projecting from an open end of the casing,
   a two piece transition fitting having cooperable coupling means carried by its two pieces, which pieces consist of a tubular body and a separable tubular nose piece, said casing and nose piece being joined together in a brazed union and said tubular body and nose piece being detachably connected and jointly forming a housing for a pair of soldered unions formed between the respective thermocouple wires and corresponding extension wires which latter extend out of the body, said tubular body containing encapsulation material which holds said wires and soldered unions insulatingly spaced apart and holds said two pieces together as a permanent union.

5. A thermocouple apparatus according to claim 4 wherein said cooperable coupling means comprise screw threads.

6. A thermocouple apparatus according to claim 4 wherein said cooperable coupling means comprise a press fit union of the tubular body with said tubular nose piece.

* * * * *